US007995889B2

(12) United States Patent
de Montmorillon et al.

(10) Patent No.: US 7,995,889 B2
(45) Date of Patent: *Aug. 9, 2011

(54) SINGLE MODE OPTICAL FIBER

(75) Inventors: Louis-Anne de Montmorillon, Versailles (FR); Denis Molin, Draveil (FR); Pieter Matthijsse, Hapert (NL); Frans Gooijer, Eindhoven (NL); Ivo Flammer, Paris (FR); Yves Lumineau, Herblay (FR); Marianne Bigot-Astruc, Marcoussis (FR); Pierre Sillard, Le Chesnay (FR); Pascale Nouchi, Ville d'Avray (FR)

(73) Assignee: Draka Comteq, B.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 12/622,071

(22) Filed: Nov. 19, 2009

(65) Prior Publication Data
US 2010/0067859 A1 Mar. 18, 2010

Related U.S. Application Data

(63) Continuation of application No. 11/556,895, filed on Nov. 6, 2006, now Pat. No. 7,623,747.

(30) Foreign Application Priority Data

Nov. 10, 2005 (FR) .................................. 05 11443

(51) Int. Cl.
*G02B 6/02* (2006.01)
(52) U.S. Cl. ........................................ 385/124; 385/126
(58) Field of Classification Search ........... 385/123–128
See application file for complete search history.

(56) References Cited

U.S. PATENT DOCUMENTS

| 4,114,980 | A | 9/1978 | Asam et al. |
| RE30,635 | E | 6/1981 | Kuppers et al. |
| 4,314,833 | A | 2/1982 | Kuppers |
| 4,385,802 | A | 5/1983 | Blaszyk et al. |
| 4,641,917 | A | 2/1987 | Glodis et al. |
| 4,750,806 | A | 6/1988 | Biswas |
| 4,836,640 | A | 6/1989 | Gartside, III et al. |
| 4,838,643 | A | 6/1989 | Hodges et al. |
| 4,852,968 | A | 8/1989 | Reed |
| 5,032,001 | A | 7/1991 | Shang |

(Continued)

FOREIGN PATENT DOCUMENTS

DE 3700565 A1 7/1988

(Continued)

OTHER PUBLICATIONS

European Search Report in counterpart European Patent Application No. 06076957, dated Jan. 26, 2007.

(Continued)

*Primary Examiner* — Kevin S Wood
(74) *Attorney, Agent, or Firm* — Summa, Additon & Ashe, P.A.

(57) ABSTRACT

An optical transmission fiber comprises a central core having an index difference $\Delta_{n1}$ with an outer optical cladding; a first inner cladding having an index difference $\Delta_{n2}$ with the outer cladding; and a second buried inner cladding having an index difference $\Delta_{n3}$ with the outer cladding of less than $-3 \cdot 10^{-3}$. The second buried inner cladding moreover contains Germanium in a weight concentration of between 0.5% and 7%. The fiber shows reduced bending and microbending losses whilst exhibiting the optical performances of a standard single-mode fiber (SSMF).

33 Claims, 4 Drawing Sheets

U.S. PATENT DOCUMENTS

| | | | |
|---|---|---|---|
| 5,106,402 A | 4/1992 | Geittner et al. |
| 5,175,785 A | 12/1992 | Dabby |
| 5,235,660 A | 8/1993 | Perry et al. |
| 5,448,674 A | 9/1995 | Vengsarkar et al. |
| 5,491,581 A | 2/1996 | Roba |
| 5,555,340 A | 9/1996 | Onishi et al. |
| 5,586,205 A | 12/1996 | Chen et al. |
| 5,673,354 A | 9/1997 | Akasaka et al. |
| 5,721,800 A | 2/1998 | Kato et al. |
| 5,802,236 A | 9/1998 | DiGiovanni et al. |
| 5,851,259 A | 12/1998 | Clayton et al. |
| 5,852,690 A | 12/1998 | Haggans et al. |
| 5,917,109 A | 6/1999 | Berkey |
| 5,946,439 A | 8/1999 | Terasawa et al. |
| 5,963,700 A | 10/1999 | Kato et al. |
| 5,966,490 A | 10/1999 | Minns et al. |
| 6,181,858 B1 | 1/2001 | Kato et al. |
| 6,185,353 B1 | 2/2001 | Yamashita et al. |
| 6,266,467 B1 | 7/2001 | Kato et al. |
| 6,280,850 B1 | 8/2001 | Oh et al. |
| 6,317,551 B1 | 11/2001 | Mitchell et al. |
| 6,334,019 B1 | 12/2001 | Birks et al. |
| 6,360,046 B1 | 3/2002 | Sasaoka et al. |
| 6,396,987 B1 | 5/2002 | de Montmorillon et al. |
| 6,415,089 B2 | 7/2002 | Kato et al. |
| 6,422,042 B1 | 7/2002 | Berkey |
| 6,424,776 B1 | 7/2002 | Nouchi et al. |
| 6,466,721 B1 | 10/2002 | Tsukitani et al. |
| 6,477,305 B1 | 11/2002 | Berkey et al. |
| 6,490,396 B1 | 12/2002 | Smith |
| 6,510,268 B1 | 1/2003 | de Montmorillon et al. |
| 6,529,666 B1 | 3/2003 | Dultz et al. |
| 6,530,244 B1 | 3/2003 | Oh et al. |
| 6,535,676 B1 | 3/2003 | de Montmorillon et al. |
| 6,542,683 B1 | 4/2003 | Evans et al. |
| 6,587,623 B1 | 7/2003 | Papen et al. |
| 6,603,913 B1 | 8/2003 | Okuno |
| 6,647,190 B2 | 11/2003 | Matsuo et al. |
| 6,650,814 B2 | 11/2003 | Caplen et al. |
| 6,658,190 B2 | 12/2003 | Hirano et al. |
| 6,671,442 B2 | 12/2003 | Wang et al. |
| 6,687,440 B2 | 2/2004 | Balestra et al. |
| 6,687,445 B2 | 2/2004 | Carter et al. |
| 6,744,959 B2 | 6/2004 | Takahasi |
| 6,754,425 B2 | 6/2004 | Jeon et al. |
| 6,771,865 B2 | 8/2004 | Blaszyk et al. |
| 6,804,441 B2 | 10/2004 | Arai et al. |
| 6,819,848 B2 | 11/2004 | Takahashi |
| 6,856,744 B2 | 2/2005 | Kumano |
| 6,859,599 B2 | 2/2005 | Mukasa |
| 6,879,764 B2 | 4/2005 | Changdar et al. |
| 6,885,802 B2 | 4/2005 | Oliveti et al. |
| 6,901,196 B2 | 5/2005 | Takahashi et al. |
| 6,904,218 B2 | 6/2005 | Sun et al. |
| 6,904,772 B2 | 6/2005 | Berkey et al. |
| 6,917,740 B2 | 7/2005 | Boek et al. |
| 6,917,743 B2 | 7/2005 | Honma et al. |
| 6,928,211 B2 | 8/2005 | Tanigawa et al. |
| 6,928,839 B2 | 8/2005 | Bilinov |
| 6,941,054 B2 | 9/2005 | Tirloni et al. |
| 6,952,519 B2 | 10/2005 | Bickham et al. |
| 6,959,137 B2 * | 10/2005 | Kalish et al. ............... 385/127 |
| 6,985,662 B2 | 1/2006 | Bickham |
| 7,008,696 B2 | 3/2006 | Kim et al. |
| 7,072,552 B2 | 7/2006 | Manyam et al. |
| 7,164,835 B2 | 1/2007 | Matsuo et al. |
| 7,171,074 B2 | 1/2007 | DiGiovanni et al. |
| 7,171,090 B2 | 1/2007 | Mattingly, III et al. |
| 7,187,833 B2 | 3/2007 | Mishra |
| 7,254,305 B2 | 8/2007 | Mishra |
| 7,272,289 B2 | 9/2007 | Bickham et al. |
| 7,283,714 B1 | 10/2007 | Gapontsev et al. |
| 7,295,741 B2 | 11/2007 | Sako et al. |
| 7,315,677 B1 | 1/2008 | Li et al. |
| 7,356,234 B2 | 4/2008 | de Montmorillon et al. |
| 7,366,386 B2 | 4/2008 | Sako et al. |
| 7,366,387 B2 | 4/2008 | Matsuo et al. |
| 7,440,665 B2 | 10/2008 | Hasegawa |
| 7,450,807 B2 | 11/2008 | Bickham et al. |
| 7,505,660 B2 | 3/2009 | Bickham et al. |
| 7,555,186 B2 | 6/2009 | Flammer et al. |
| 7,587,111 B2 | 9/2009 | de Montmorillon et al. |
| 7,620,282 B2 | 11/2009 | Bickham |
| 7,623,747 B2 | 11/2009 | de Montmorillon |
| 2002/0031317 A1 | 3/2002 | Tsukitani et al. |
| 2002/0061175 A1 | 5/2002 | Matsuo et al. |
| 2002/0122644 A1 | 9/2002 | Birks et al. |
| 2003/0081921 A1 | 5/2003 | Sillard et al. |
| 2003/0142938 A1 | 7/2003 | Koyano et al. |
| 2003/0152349 A1 | 8/2003 | Lauzon et al. |
| 2003/0190128 A1 | 10/2003 | Jang et al. |
| 2003/0210878 A1 | 11/2003 | Kumano et al. |
| 2003/0231847 A1 | 12/2003 | Varner et al. |
| 2004/0033039 A1 | 2/2004 | Oliveti et al. |
| 2004/0086245 A1 | 5/2004 | Farroni et al. |
| 2005/0244120 A1 | 11/2005 | Mishra |
| 2006/0115224 A1 | 6/2006 | Kutami et al. |
| 2006/0140560 A1 | 6/2006 | Allen et al. |
| 2007/0003198 A1 | 1/2007 | Gibson et al. |
| 2007/0003199 A1 | 1/2007 | Mattingly et al. |
| 2007/0053642 A1 | 3/2007 | Mishra |
| 2007/0104437 A1 | 5/2007 | Bookbinder et al. |
| 2007/0127878 A1 | 6/2007 | de Montmorillon et al. |
| 2007/0147756 A1 | 6/2007 | Matsuo et al. |
| 2007/0196061 A1 | 8/2007 | Bickham et al. |
| 2007/0258686 A1 | 11/2007 | de Montmorillon et al. |
| 2007/0280615 A1 | 12/2007 | de Montmorillon et al. |
| 2008/0013905 A1 | 1/2008 | Bookbinder et al. |
| 2008/0056654 A1 | 3/2008 | Bickham et al. |
| 2008/0056658 A1 | 3/2008 | Bickham et al. |
| 2008/0124028 A1 | 5/2008 | Bickham et al. |
| 2008/0152288 A1 | 6/2008 | Flammer |
| 2008/0226241 A1 | 9/2008 | Sugizaki et al. |
| 2009/0263092 A1 | 10/2009 | Flammer et al. |
| 2010/0021117 A1 | 1/2010 | de Montmorillon |
| 2010/0067859 A1 | 3/2010 | de Montmorillon |

FOREIGN PATENT DOCUMENTS

| | | |
|---|---|---|
| EP | 0059564 | 9/1982 |
| EP | 0327702 A2 | 8/1989 |
| EP | 0848266 A1 | 6/1998 |
| EP | 0991967 A1 | 4/2000 |
| EP | 1398653 A1 | 3/2004 |
| EP | 1443347 A2 | 8/2004 |
| EP | 1698920 A1 | 9/2006 |
| EP | 1762867 | 3/2007 |
| EP | 1785754 A1 | 5/2007 |
| EP | 1845399 A1 | 10/2007 |
| GB | 2228585 A | 8/1990 |
| JP | 06-196778 | 7/1994 |
| JP | 09-048629 | 2/1997 |
| JP | 09-218319 | 8/1997 |
| JP | 09-311231 | 12/1997 |
| JP | 2006-133314 | 5/2006 |
| WO | 99/00685 A1 | 1/1999 |
| WO | 00/14580 A1 | 3/2000 |
| WO | 01/27667 A2 | 4/2001 |
| WO | 01/47822 A1 | 7/2001 |
| WO | 02/12931 A2 | 2/2002 |
| WO | 0212931 A2 | 2/2002 |
| WO | 02/29459 A1 | 4/2002 |
| WO | 0239159 A1 | 5/2002 |
| WO | 03107054 A1 | 12/2003 |
| WO | 2004/027941 | 4/2004 |
| WO | 2004/092794 A1 | 10/2004 |
| WO | 2004109352 A1 | 12/2004 |
| WO | 2006/090519 | 8/2006 |
| WO | 2008027351 A2 | 3/2008 |

OTHER PUBLICATIONS

European Office Action in counterpart European Patent Application No. 06076957, dated Nov. 2, 2007.

Matsuo et al., "Bend-Insensitive and Low Splice-Loss Optical Fiber for Indoor Wiring in FTTH", OFC'04 Proceedings, paper Th13 (2004) [Cited in Specification].

Sakabe et al., "Enhanced Bending Loss Insensitive Fiber and New Cables for CWDM Access Networks", 53rd IWCS Proceedings, pp. 112-118 (2004) [Cited in Specification].

Bandou et al., "Development of Premises Optical Wiring Components Using Hole-Assisted Fiber" 53rd IWCS Proceedings, pp. 119-122 (2004) [Cited in Specification].

Yokokawa et al., "Ultra-Low Loss and Bend Insensitive Pure-silica-core Fiber Complying with G.652 C/D and its Applications to a Loose Tube Cable", 53rd IWCS Proceedings, pp. 150-155 (2004) [Cited in Specification].

Matsuo et al., "Low-Bending-Loss and Low-Splice-Loss Single-Mode Fibers Employing a Trench Index Profile", IEICE Trans. Electron., vol. E88-C, No. 5, pp. 889-895, May 2005.

Unger et al., "Low-loss Single mode Fibre with reduced inner cladding", OFC 1987 Post deadline paper.

De Montmorillon et al., "Bend-Optimized G.652D Compatible Trench-Assisted Single Mode Fibers", IWCS, Proceedings of the 55th IWCS/Focus, pp. 342-347, Providence, RI, (Nov. 2006).

U.S. Appl. No. 60/841,490, filed Aug. 31, 2006.

U.S. Appl. No. 60/879,702, filed Jan. 10, 2007.

U.S. Appl. No. 60/841,458, filed Aug. 31, 2006.

U.S. Appl. No. 60/861,776, filed Nov. 29, 2006.

Jeunhomme, "Single-Mode Fiber Optics, Principles and Applications, Second Edition, Revised and Expanded", pp. 38-49, (1990).

Allard, et al., "Bending loss of a single-mode triangular-index fiber with a depressed cladding ring by a vector mode method", SPIE vol. 1792 (1992), 66. 146-155.

Allard, et al., "Bending-loss studies of a single-mode triangular-index fiber with a depressed cladding ring with a vector-mode method", Applied Optics, vol. 33, No. 33, Nov. 20, 1994, pp. 7725-7732.

Yip, et al, "Dispersion Studies of a Single-Mode Triangular-Core Fiber with a Trench by the Vector Mode Analysis", 1989 IEEE MTT-S Digest, pp. 1175-1178.

Yip et al., "Dispersion studies of a single-mode triangular-index fiber with a trench by the vector mode analysis", Applied Optics, vol. 29, No. 36, Dec. 20, 1990, pp. 5343-5352.

Bing et al., "Low-loss Holey Fiber", Hitachi Cable Review No. 24, Aug. 2005, pp. 1-5.

S. Matsuo et al., "Low-Bending-Loss and Low-Splice-Loss Single-Mode Fibers Employing a Trench Index Profile", Journal of Lightwave Technology, Vo. 23 n. 11, pp. 3494-3499, (2005).

K. Himeno et al., "Low-Bending-Loss Single Mode Fibers for Fiber-To-The Home", Journal of Lightwave Technology, vol. 23, No. 11, pp. 3494-3499, (2005).

T. Hasegawa et al., "Bend-Insensitive Single-Mode Holey Fiber with SMF-Compatibility for Optical Wiring Applications", Proceedings ECOC'03, paper We2.7.3, Rimini, Italy, (2003).

D. Nishioka et al., "Development of Holey Fiber Supporting Extra-Small Diameter Bending," SEI Technical Review, No. 58, pp. 42-47, (2004).

K. Miyake et al., "Vend Resistant Photonic Crystal Fiber Compatible with Conventional Single Mode Fiber," Proceedings ECOC'04, paper Mo3.3.4, Stockholm, Sweden, (2004).

Y. Tsuchida et al., "Design and Characterization of Single-Mode Holey Fibers with Low Bending Losses", Optics Express, vol. 13, No. 12, pp. 4470-4479, (2005).

K. Ohsono et al., "Hight Performance Optical Fibers for Next Generation Transmission Systems," Hitachi Cable Review, No. 22, pp. 1-5, (2003).

K. Nakajima et al., "Hole-Assisted Fiber Design for Small Bending and Splice Loss," IEEE Photonics Technology Letters, vol. 15, No. 12, pp. 1737-1739, (2003).

K. Ieda et al., "Transmission Characteristics of a Hole-Assisted Fiber Cord for Flexible Optical Wiring," Proceedings 54th IWCS, pp. 63-68, (2005).

N. Guan et al., "Hole-Assisted Single Mode Fibers for Low Bending Loss," Proceedings ECOC'04, paper M03.3.5, Stockholm, Sweden, (2004).

European Search Report and Written Opinion in commonly owned European Application No. 07006909, dated Jul. 7, 2007.

French Search Report and Written Opinion in commonly owned French Application No. 0603128, dated Jul. 20, 2006.

Botineau, J. et al, "Effective Stimulated Brillouin Gain in Single Mode Optical Fibers," Electronics Letters, vol. 31, No. 23, (Nov. 9, 1995).

Yoshizawa, N. et al., "Stimulated Brillouin Scattering Suppression by Means of Applying Strain Distribution to Fiber with Cabling," IEEE JLT, vol. 11, No. 10, pp. 1518-1522, (1993).

* cited by examiner

SINGLE MODE OPTICAL FIBER

This application is a continuation of commonly assigned U.S. application Ser. No. 11/556,895 for a Single Mode Optical Fiber, (filed Nov. 6, 2006, and published Jun. 7, 2007, as Publication No. 2007/0127878 A1), now U.S. Pat. No. 7,623,747, which itself claims the benefit of French Application No. 05/11443 (filed Nov. 10, 2005 at the French Patent Office). Each of the foregoing patent applications, patent application publication, and patent is hereby incorporated by reference in its entirety.

The present invention relates to the field of optical fiber transmissions, and more specifically to a line fiber having reduced bending and microbending losses.

For optical fibers, the index profile is generally qualified in relation to the plotting of a graph showing the function associating the refractive index of the fiber with the radius of the fiber. Conventionally, the distance r to the center of the fiber is shown along the abscissa axis, and the difference between the refractive index and the refractive index of the fiber cladding is shown along the ordinate axis. The index profile is therefore described as "step", "trapezoid" or "triangular" for graphs respectively showing step, trapezoid or triangular shapes. These curves are generally representative of the theoretical or set profile of the fiber, the stresses of fiber manufacture possibly leading to a substantially different profile.

An optical fiber conventionally consists of an optical core whose function is to transmit and optionally amplify an optical signal, and an optical cladding whose function is to confine the optical signal within the core. For this purpose, the refractive indexes of the core $n_c$ and of the cladding $n_g$ are such that $n_c > n_g$. As is well known, the propagation of an optical signal in a single-mode optical fiber breaks down into a fundamental mode guided in the core, and into secondary modes guided over a certain distance in the core-cladding assembly and called cladding modes.

As line fibers for optical fiber transmission systems, Single Mode Fibers (SMF) are typically used. These fibers show chromatic dispersion and a chromatic dispersion slope meeting specific telecommunications standards.

For the needs of compatibility between the optical systems of different manufacturers, the International Telecommunication Union (ITU) has laid down a standard referenced ITU-T G.652 which must be met by a Standard Single Mode Fiber (SSMF).

This G.652 standard for transmission fibers, recommends inter alia, a range of [8.6; 9.5 μm] for the Mode Field Diameter (MFD) at a wavelength of 1310 nm; a maximum of 1260 nm for the cabled cut-off wavelength; a range of [1300; 1324 nm] for the dispersion cancellation wavelength denoted $\lambda_0$; a maximum of 0.093 ps/nm²-km for the chromatic dispersion slope. The cabled cut-off wavelength is conventionally measured as the wavelength at which the optical signal is no longer single-mode after propagation over twenty-two meters of fiber, such as defined by sub-committee 86A of the International Electrotechnical Commission under standard IEC 60793-1-44.

Also, for a given fiber, a so-called MAC value is defined as the ratio of the mode field diameter of the fiber at 1550 nm over the effective cut-off wavelength $\lambda c_{eff}$ otherwise called cut-off wavelength. The cut-off wavelength is conventionally measured as the wavelength at which the optical signal is no longer single-mode after propagation over two meters of fiber such as defined by sub-committee 86A of the International Electrotechnical Commission under standard IEC 60793-1-44. The MAC value is used to assess fiber performance, in particular to find a compromise between mode field diameter, effective cut-off wavelength and bending losses.

FIG. 1 illustrates the experimental results of the applicant giving the bending losses at a wavelength of 1625 nm with a bending radius of 15 mm in a standard SSMF fiber in relation to the MAC value at a wavelength of 1550 nm. It can be seen that the MAC value influences the bending losses of the fiber and that these bending losses may be reduced by reducing the MAC value.

However, a reduction in the MAC value by reducing the mode field diameter and/or by increasing the effective cut-off wavelength, may lead to overstepping the G.652 standard, making the fiber commercially incompatible with some transmission systems.

Adhering to the G.652 standard and the reduction in bending losses is a true challenge for applications of fibers intended for optical fiber systems to homes, called Fiber To The Home systems (FTTH) or fiber optical systems up to the curb or up to the building, so-called fibers to the curb (FTTC).

Indeed, a transmission system through optical fibers comprises storage boxes in which fiber overlengths are provided in the case of future interventions; these overlengths are wound in the boxes. Because of the intention to miniaturize these boxes for FTTH or FTTC applications, the single mode fibers in this context are intended to be wound on increasingly small diameters (so as to reach bending radii as small as 15 mm or 11 mm). Moreover, within the scope of FTTH or FTTC applications, the fiber risks being subject to harsher installation constraints than in applications at longer distances, i.e., the presence of accidental bendings related to the low cost of the installation and to the environment. Provision must be made for the presence of accidental bending radii equal to 7.5 mm or even 5 mm. It is therefore absolutely necessary in order to meet the constraints related to the storage boxes and to the installation constraints that the single mode fibers used for FTTH or FTTC applications have limited bending losses. Nevertheless it is understood that this reduction in bending losses should not be achieved to the detriment of a loss of the single mode character of the signal which would strongly deteriorate the signal or to the detriment of introducing significant junction optical losses.

The publication by S. Matsuo et al. "Bend-Insensitive and Low Splice-Loss Optical Fiber for Indoor Wiring in FTTH", OFC'04 Proceedings, paper Th13 (2004) describes an index profile for single mode fiber (SMF) which enables a reduction in bending losses. However, this fiber shows a chromatic dispersion of between 10.2 ps/nm-km and 14.1 ps/nm-km which lies outside the G.652 standard.

The publication by I. Sakabe et al. "Enhanced Bending Loss Insensitive Fiber and New Cables for CWDM Access Networks", 53$^{rd}$ IWCS Proceedings, pp. 112-118 (2004) proposes reducing the Mode Field Diameter to reduce bending losses. This reduction in mode field diameter leads however to overstepping the G.652 standard.

The publication by K. Bandou et al. "Development of Premise Optical Wiring Components Using Hole-Assisted Fiber" 53$^{rd}$ IWCS Proceedings, pp. 119-122 (2004) proposes a hole fiber having the optical characteristics of a SSMF fiber with reduced bending losses. The cost of manufacturing said fiber and the high attenuation levels at the present time (>0.25 dB/km) make it difficult to be given commercial use in FTTH systems.

The publication by T. Yokokawa et al. "Ultra-Low Loss and Bend Insensitive Pure-Silica-Core Fiber Complying with G.652 C/D and its Applications to a Loose Tube Cable", 53$^{rd}$ IWCS Proceedings, pp 150-155 (2004) proposes a pure silica core fiber PSCF, having reduced transmission and bending losses, but with a reduced mode field diameter lying outside the G.652 standard.

U.S. Pat. No. 6,771,865 describes a profile of a transmission fiber with reduced bending losses. The fiber has a central core, an annular inner cladding and an optical outer cladding. The annular cladding is co-doped with Germanium and Fluorine. The information given in this document does not enable determination of whether or not the fiber meets the criteria laid down by the G.652 standard.

U.S. Pat. No. 4,852,968 describes the profile of a transmission fiber having reduced bending losses. However this fiber has a chromatic dispersion which does not meet the criteria of G.652 standard; the G.652 standard requires cancellation of chromatic dispersion at wavelengths of between 1300 nm and 1324 nm, but the fiber described in U.S. Pat. No. 4,852,962 shows cancellation of the chromatic dispersion at the wavelengths of between 1400 nm and 1800 nm.

WO-A-2004/092794 describes a profile of a transmission fiber with reduced bending losses. The fiber has a central core, a first inner cladding, a second buried inner cladding and an outer optical cladding. Some of the fiber examples described in this document also meet the criteria of the G.652 standard. The fiber described in this document is manufactured by Vapor phase Axial Deposition (VAD) or Chemical Vapor Deposition (CVD) type techniques. The fiber described in this document does not however identify the problems of microbending losses.

There is therefore a need for a transmission fiber with which it is possible to meet the criteria of the G.652 standard, i.e. which can be given commercial use in transmission systems of the FTTH or FTTC type, and which shows both reduced bending losses and reduced microbending losses. In FTTH or FTTC applications, fibers are subjected to higher bending and microbending stresses than in long-haul transmission applications. Indeed, in FTTH or FTTC applications, overlengths of fibers are generally wound in increasingly miniaturized storage boxes; moreover the fiber will be subject to significant bending stresses related to the environment of its installation.

For this purpose, the invention proposes a fiber profile comprising a central core, a first inner cladding, a deeply buried second inner cladding, and an outer cladding. The second inner cladding contains Germanium.

The presence of Germanium in the deeply buried cladding, even though Germanium is a dopant whose effect is to increase the index of silica, makes it possible to increase the elastic-optical coefficient of the buried cladding. Therefore when stresses are applied to the fiber, in particular when the fiber undergoes bending or micro-bending, the presence of the deeply buried cladding containing Germanium allows to limit the effects of stresses on the changes in refractive index in the fiber. The optical losses are therefore reduced when such stresses are applied to a fiber having a second deeply buried inner cladding containing Germanium.

More particularly, the invention proposes an optical transmission fiber comprising:
  a central core having an index difference $\Delta n_1$ with an outer optical cladding;
  a first inner cladding having an index difference $\Delta n_2$ with the outer cladding;
  a second, buried, inner cladding having an index difference $\Delta n_3$ with the outer cladding of less than $-3 \cdot 10^{-3}$, and containing Germanium in a weight concentration of between 0.5% and 7%.

According to one characteristic, the index difference $\Delta n_3$ of the second inner cladding with the outer cladding is greater than $-15 \cdot 10^{-3}$.

According to another characteristic, the index difference between the central core and the first inner cladding ($\Delta n_1 - \Delta n_2$) lies between $3.9 \cdot 10^{-3}$ and $5.9 \cdot 10^{-3}$.

According to another characteristic, the second buried cladding has a radius of between 12 µm and 25 µm.

According to another characteristic, the central core has a radius of between 3.5 µm and 4.5 µm, and shows an index difference with the outer cladding of between $4.2 \cdot 10^{-3}$ and $6.1 \cdot 10^{-3}$.

According to another characteristic, the first inner cladding has a radius of between 7.5 µm and 14.5 µm, and shows an index difference with the outer cladding of between $-1.2 \cdot 10^{-3}$ and $1.2 \cdot 10^{-3}$.

According to another characteristic, the integral of the central core, defined as:

$$I_1 = \int_0^{r_1} Dn(r) \cdot dr \approx r_1 \times Dn_1$$

lies between $17 \cdot 10^{-3}$ µm and $24 \cdot 10^{-3}$ µm.

According to another characteristic, at a wavelength of 1310 nm, the present fiber shows a chromatic dispersion slope of 0.093 ps/nm²-km or less.

According to another characteristic, the present fiber shows cancellation of chromatic dispersion at a wavelength of between 1300 nm and 1324 nm.

According to another characteristic, the present fiber has a cabled cut-off wavelength of 1260 nm or less.

According to another characteristic, at a wavelength of 1625 nm, the present fiber shows bending losses for a winding of 100 turns around a bending radius of 15 mm, that are 1 dB or less.

According to another characteristic, at a wavelength of 1625 nm, the present fiber shows bending losses for a winding of 1 turn around a bend radius of 11 mm, of 0.5 dB or less.

According to another characteristic, at a wavelength of 1625 nm, the present fiber shows bending losses for a winding of 1 turn around a bend radius of 5 mm, of 2 dB or less.

According to another characteristic, up to a wavelength of 1625 nm, the present fiber shows microbending losses, measured by the so-called fixed diameter drum method, of 0.8 dB/km or less.

The invention also concerns a method for manufacturing an optical transmission fiber of the invention, the method comprising the steps of:
  providing a silica tube and positioning said tube on a lathe;
  injecting a gaseous mixture of oxygen $O_2$ silica $SiCl_4$, Fluorine $C_2F_6$ and Germanium $GeO_2$ in the tube;
  ionizing the gaseous mixture to obtain a plasma by microwave heating to deposit a layer of doped silica forming the second, buried, inner cladding;
  successively injecting gaseous mixtures and ionizing said mixtures to deposit layers of doped silica forming the first inner cladding and the central core.

The invention further relates to a Fiber To The Home (FTTH) or Fiber To The Curb (FTTC) optical system comprising at least an optical module or a storage box according to the invention.

Other characteristics and advantages of the invention will become apparent on reading the following description of embodiments of the invention given by way of example and with reference to the appended drawings showing:

FIG. 1, previously described, a graph illustrating the bending losses at a wavelength of 1625 nm with a bending radius of 15 mm in a standard single-mode fiber (SSMF) in relation to the MAC value at a wavelength of 1550 nm;

FIG. 2, a graph showing the set profile of a single-mode fiber (SMF) according to one embodiment of the invention, FIGS. 3a to 3c, graphs illustrating, for different bending radii, the bending losses at a wavelength of 1625 nm in relation to the MAC value at a wavelength of 1550 nm for different standard single-mode fibers (SSMF) and for different fibers of the invention, FIGS. 4a and 4b, graphs illustrating losses through microbending.

The present fiber has a central core, a first inner cladding and a second, buried, inner cladding. By buried cladding is meant a radial portion of the fiber whose refractive index is lower than the index of the outer cladding. The second, buried, inner cladding has an index difference with the outer cladding that is less than $-3 \cdot 10^{-3}$ and may reach $-15 \cdot 10^{-3}$. Also, the buried cladding contains Germanium in a weight concentration of between 0.5% and 7%.

As known per se, an optical fiber is obtained by drawing of a preform. For example the preform may be a glass tube (pure silica) of very high quality which forms part of the outer cladding and surrounds the central core and the inner claddings of the fiber; this tube can then be sleeved or refilled to increase its diameter before proceeding with the drawing operation on a draw tower. To manufacture the preform, the tube is generally mounted horizontally and held in place at its two ends by glass rods in a lathe; the tube is then rotated and locally heated to deposit components determining the composition of the preform. This composition determines the optical characteristics of the future fiber.

The depositing of components in the tube is commonly called "doping", i.e. "impurities" are added to the silica to modify its refractive index. Hence, Germanium (Ge) or Phosphorus (P) increase the refractive index of the silica; they are often used to dope the central core of the fiber. Also, Fluorine (F) or Boron (B) lower the refractive index of the silica; they are often used to form buried claddings or as co-dopant with Germanium when it is desired to compensate for the increase in refractive index in a photosensitive cladding.

A preform with an buried cladding is difficult to manufacture. Fluorine does not incorporate easily in silica when heated beyond a certain temperature whereas a high temperature is required to manufacture glass. The compromise between a high temperature, required for glass-making, and a low temperature promoting proper incorporation of the Fluorine does not make it possible to obtain indexes much lower than that of silica.

It is proposed to manufacture the preform of the present fiber using a PCVD technique (Plasma Chemical Vapor Deposition) since it allows reactions at lower temperatures than conventional techniques (CVD, VAD, OVD) by ionizing the reaction components. Said manufacturing technique is described in documents US RE 30,635 and U.S. Pat. No. 4,314,833; it allows major incorporation of Fluorine in the silica in order to form deeply buried claddings.

The use of the PCVD technique to manufacture the inventive fiber also makes it possible to add Germanium to the buried cladding. As indicated previously, Germanium increases the refractive index of the silica; it is therefore generally highly unadvisable to incorporate the same in a fiber section for which it is sought to obtain a lower refractive index than silica. PCVD makes it possible however to produce a high number of highly reactive Fluorine ions; it then becomes possible to add Germanium to the reaction and nonetheless to obtain an buried inner cladding.

Therefore, the present fiber comprises Germanium in the assembly of inner claddings including the cladding whose index is less than $-3 \cdot 10^{-3}$. The presence of Germanium in the buried cladding modifies the viscosity of the silica and the elastic-optical coefficient in this said cladding.

FIG. 2 illustrates an index profile for a transmission fiber of the invention. The illustrated profile is a set profile, i.e. it represents the theoretical profile of the fiber, the fiber actually obtained after drawing from a preform possibly giving a substantially different profile.

The single-mode transmission fiber of the invention comprises a central core having an index difference $\Delta n_1$ with an outer cladding, acting as optical cladding; a first inner cladding having an index difference $\Delta n_2$ with the outer cladding; a second inner cladding, deeply buried and having an index difference $\Delta n_3$ with the outer cladding. The refractive indexes in the central core, in the first cladding and in the second inner cladding are substantially constant over their entire width; the set profile is therefore truly a single-mode fiber. The width of the core is defined by its radius $r_1$ and the width of the claddings by their respective outer radii $r_2$ and $r_3$.

To define a set index profile for an optical fiber, the index of the outer cladding is generally taken as reference. The index values of the central core, buried claddings and the ring are then given as index differences $\Delta n_{1,2,3}$. Generally, the outer cladding is formed of silica, but this outer cladding may be doped to increase or reduce its refractive index, for example to modify the signal propagation characteristics.

Each section of the fiber profile can therefore be defined using integrals which associate the variations in indexes with the radius of each fiber section.

Three integrals can hence be defined for the present fiber, which represent the core surface $I_1$, the surface of the first inner cladding $I_2$ and the surface of the second, buried, inner cladding $I_3$. The expression "surface" is not to be construed geometrically but corresponds to a value taking two dimensions into account. These three integrals can be expressed as follows:

$$I_1 = \int_0^{r_1} Dn(r) \cdot dr \approx r_1 \times Dn_1$$

$$I_2 = \int_{r_1}^{r_2} Dn(r) \cdot dr \approx (r_2 - r_1) \times Dn_2$$

$$I_3 = \int_{r_2}^{r_3} Dn(r) \cdot dr \approx (r_3 - r_2) \times Dn_3$$

Table I below gives the limit values of radii and index differences, and the limit values of the integral $I_1$ that are required so that the fiber shows reduced bending losses and microbending losses whilst meeting the optical propagation criteria of G.652 standard for transmission fibers. The values given in the table correspond to the set profiles of the fibers.

TABLE I

| $r_1$ (μm) | $r_2$ (μm) | $r_3$ (μm) | $r_1/r_2$ | $\Delta n_1$ ($\cdot 10^3$) | $\Delta n_2$ ($\cdot 10^3$) | $\Delta n_3$ ($\cdot 10^3$) | $\Delta n_1 - \Delta n_2$ | $I_1$ (μm $\cdot 10^3$) |
|---|---|---|---|---|---|---|---|---|
| 3.5 | 7.5 | 12.0 | 0.27 | 4.2 | −1.2 | −15 | 3.9 | 17 |
| 4.5 | 14.5 | 25.0 | 0.5 | 6.2 | 1.2 | −3 | 5.9 | 24 |

The value of the integral $I_1$ of the central core influences the shape and size of the fundamental propagation mode of the signal in the fiber. An integral value for the central core of between $17 \cdot 10^{-3}$ μm and $24 \cdot 10^{-3}$ μm makes it possible in particular to maintain a mode field diameter that is compatible with the G.652 standard.

Table II below gives examples of possible index profiles for an transmission fiber according to the invention. The first column allocates a reference to each profile. The following columns give the radii values of each section ($r_1$ to $r_3$); and the following columns give the values of the index differences of each section with the outer cladding ($\Delta n_1$ to $\Delta n_3$). The index values are measured at the wavelength of 633 nm.

TABLE II

| Example | $r_1$ (μm) | $r_2$ (μm) | $r_3$ (μm) | $\Delta n_1$ (·10³) | $\Delta n_2$ (·10³) | $\Delta n_3$ (·10³) |
|---|---|---|---|---|---|---|
| 1 | 2.86 | 6.90 | 13.24 | 5.41 | 2.00 | −3.70 |
| 2 | 3.86 | 9.50 | 15 | 5.16 | 0.69 | −5.0 |
| 3 | 4.02 | 9.55 | 15 | 5.31 | 0.45 | −5.0 |
| 4 | 3.86 | 8.66 | 15 | 5.41 | 0.85 | −5.0 |

The present transmission fiber, having an index profile such as described previously, shows reduced bending losses and microbending losses at useful wavelengths.

In addition, the present fiber meets the criteria of G.652 standard.

Tables III and IV below illustrate the simulated optical characteristics for transmission fibers corresponding to the index profiles in Table II.

In Table III, column one reproduces the references of Table II. The following columns, for each fiber profile, give the values of the effective cut-off wavelength $\lambda_{Ceff}$, cabled cut-off wavelength $\lambda_{CC}$, mode field diameters 2W02 for the wavelengths 1310 nm and 1550 nm, the cancellation wavelength of the chromatic dispersion $\lambda_0$, the dispersion slope $P_0$ at $\lambda_0$, the chromatic dispersions C for the wavelengths 1550 nm and 1625 nm.

In Table IV, column one reproduces the references of Table III. The following column gives the MAC values at a wavelength of 1550 nm. The three following columns give the values for the bending losses BL for the respective bending radii of 5, 11 and 15 mm at a wavelength of 1625 nm. The following column, for a radius of 15 mm, gives the relative bending losses normalized with respect to the standard bending losses of a SSMF fiber having the same MAC value at a wavelength of 1550 nm. The last-but-one column gives the microbending losses obtained with the pin-array test (10 pins of 1.5 mm) at a wavelength of 1550 nm.

This test uses an array of ten polished needles, of diameter 1.5 mm and spaced apart by 1 cm. The fiber is woven across the array orthogonally to the axis of the needles. The fiber and the array are pressed between two rigid plates coated with a layer of approximately 3 mm of high density polyethylene foam. The layers of the assembly (plates, array, fiber) are positioned horizontally and the assembly is covered with a weight of 250 g. The last column indicates the microbending losses measured using the fixed diameter drum method at a wavelength of 1625 nm. This method is described in the technical recommendations of the International Electrotechnical Commission, sub-committee 86A under reference IEC TR-62221. The diameter of the drum used is 60 cm; the drum is covered with extra-fine sandpaper. The values of the bending losses BL are indicated at a wavelength of 1625 nm.

TABLE III

| N° | $\lambda_{Ceff}$ (μm) | $\lambda_{CC}$ (μm) | 2W02 @1310 nm (μm²) | 2W02 @1550 nm (μm²) | $\lambda_0$ (nm) | $P_0$ (ps/nm²-km) | C @1550 nm (ps/nm-km) | C @1625 nm (ps/nm-km) |
|---|---|---|---|---|---|---|---|---|
| 1 | 1.13 | <1.26 | 9.10 | 10.18 | 1308 | 0.097 | 19.2 | 23.9 |
| 2 | 1.23 | <1.26 | 9.16 | 10.36 | 1312 | 0.091 | 18.1 | 22.9 |
| 3 | 1.25 | <1.26 | 9.01 | 10.13 | 1318 | 0.089 | 17.3 | 22.0 |
| 4 | 1.25 | <1.26 | 9.00 | 10.08 | 1318 | 0.091 | 17.8 | 22.5 |

TABLE IV

| N° | MAC @1550 nm | BL R = 5 mm @1625 nm (dB/turn) | BL R = 11 mm @1625 nm (dB/turn) | BL R = 15 mm @1625 nm (dB/100 turns) | BLrel R = 15 mm @1625 nm | BLμ Pin-array test @1550 nm (dB) | BLμ Drum method @1625 nm (dB/km) |
|---|---|---|---|---|---|---|---|
| 1 | 9.0 | ≦5 | ≦2 | | 1/5 | | |
| 2 | 8.4 | 2 | ≦0.5 | ≦1 | 1/5 | 0.025 | ≦0.8 |
| 3 | 8.1 | 1 | ≦0.1 | ≦0.4 | 1/5 | ≦0.025 | ≦0.8 |
| 4 | 8.1 | 1 | ≦0.1 | ≦0.4 | 1/5 | ≦0.025 | ≦0.8 |

It can be seen in Table III that examples 2 to 4 indeed comply with the G.652 standard, example 1 shows a dispersion slope $P_0$ lying slightly outside the G.652 standard.

In particular, the fiber in examples 2 to 4 shows cancellation of chromatic dispersion for a wavelength of between 1300 nm and 1324 nm; this is in agreement with the G.652 standard. The fiber in examples 2 to 4 also shows, for a wavelength of 1310 nm, a chromatic dispersion slope that is 0.093 ps/nm²-km or less; which complies with the G.652 standard. Also the fiber in examples 2 to 4 shows a cabled cut-off wavelength that is 1260 nm or less, meeting the criteria of the G.652 standard which requires a cabled cut-off wavelength of 1260 nm or less.

In addition, it can be seen in table IV that examples 2 to 4 exhibit distinctly improved bending losses with respect to the losses of standard SSMF transmission fiber. The microbending losses are also improved.

The graphs in FIGS. 3a, 3b and 3c show bending loss measurements obtained with fibers manufactured according to the invention and for standard fibers, with bending radii of R=5 mm, R=11 mm and R=15 mm at a wavelength of 1625 nm. The bending losses here are given at the end of one loop (for R=5 mm and R=11 mm) or at the end of 100 loops (for R=15 mm).

Figure 1:
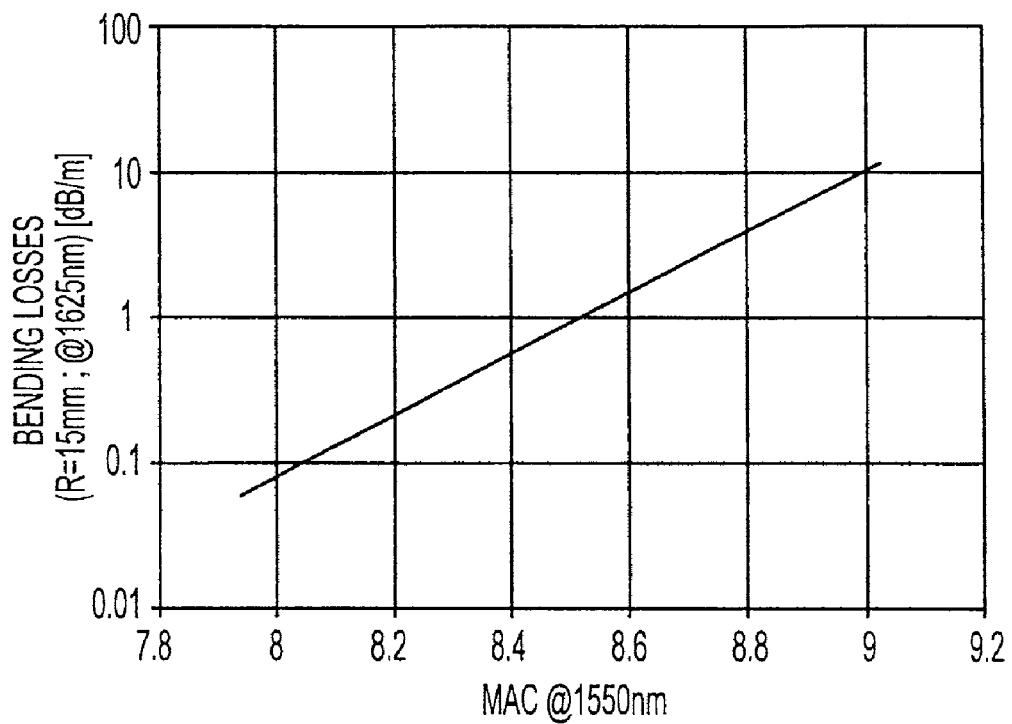
Figure 2:
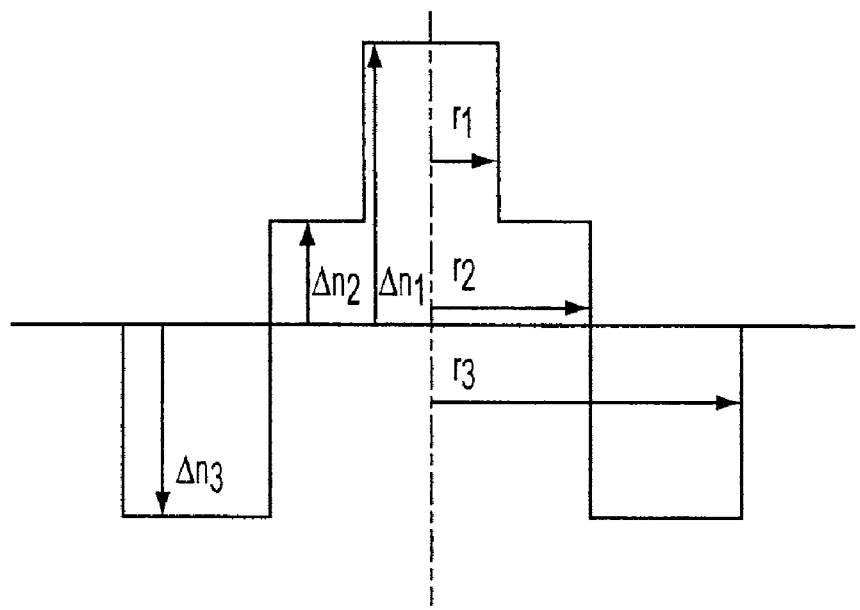
Figure 3A:
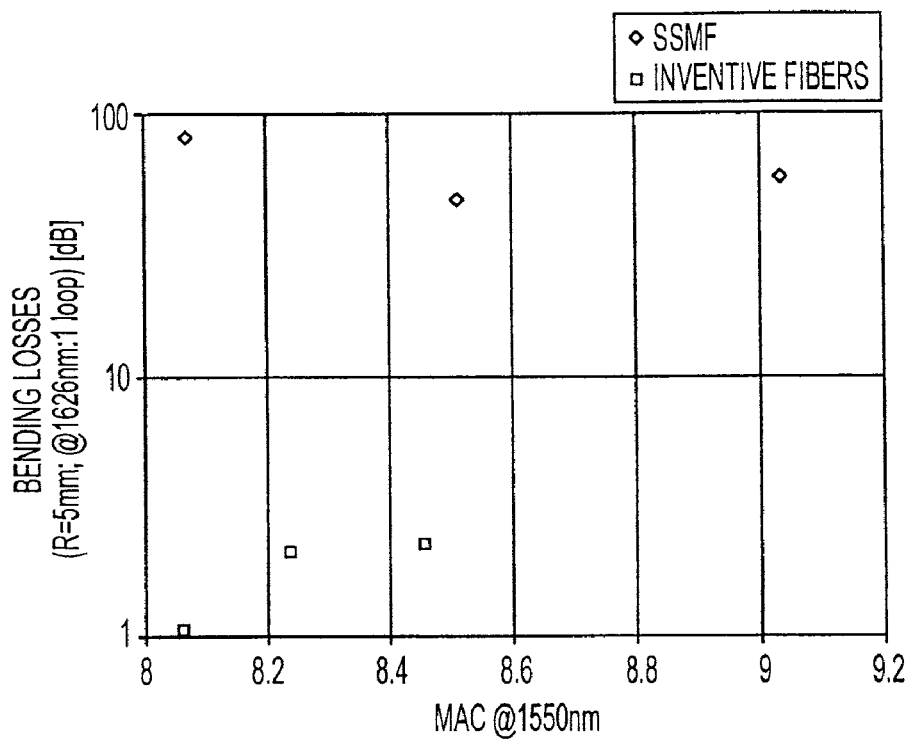
Figure 3B:
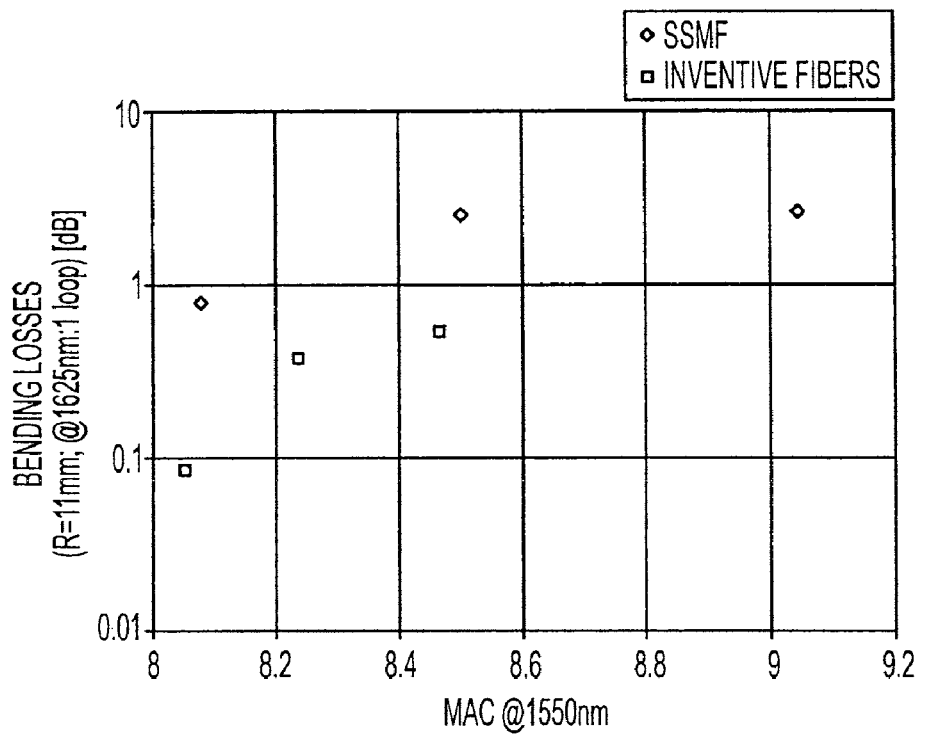
Figure 3C:
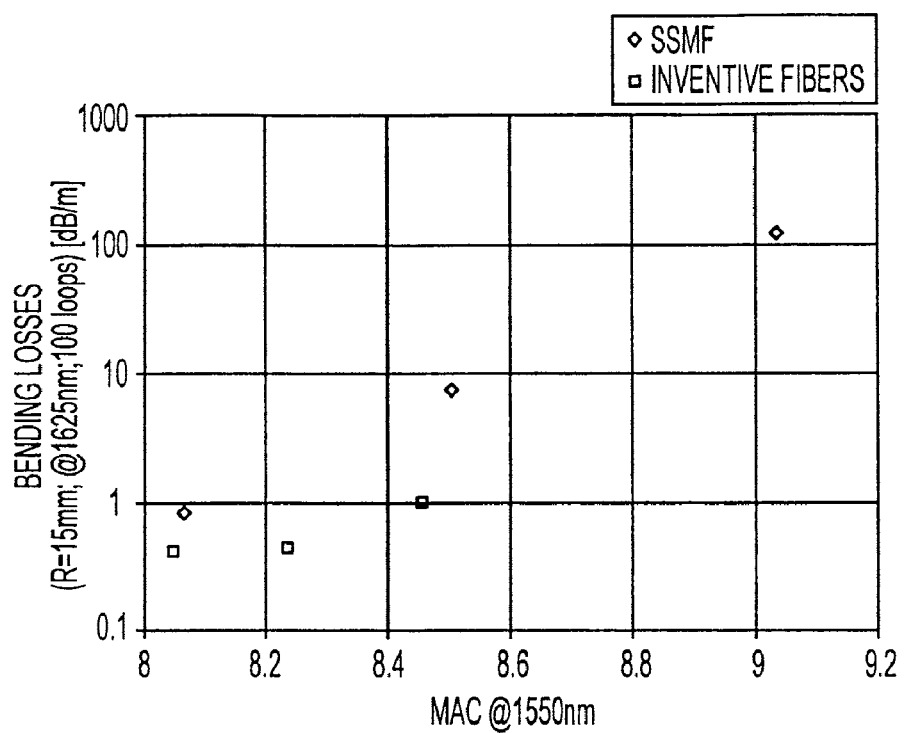
Figure 4A:
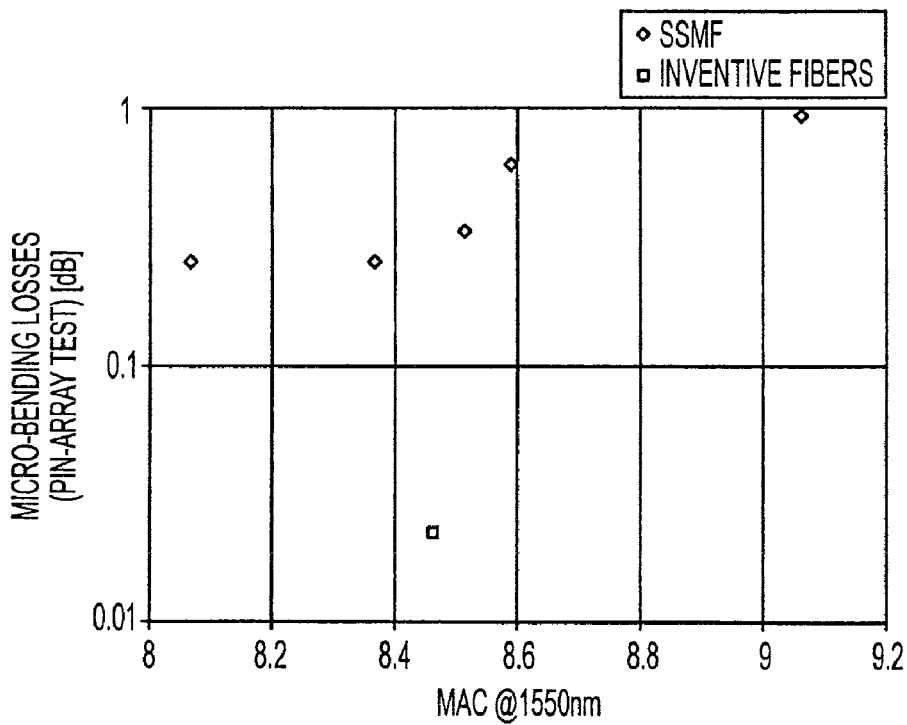
FIG. 4a shows microbending losses for fibers manufactured according to the invention, characterized by the pin-array test and measured at a wavelength of 1550 nm, in relation to the MAC value at a wavelength of 1550 nm for different SSMF fibers and for a fiber of the invention.
Figure 4B:
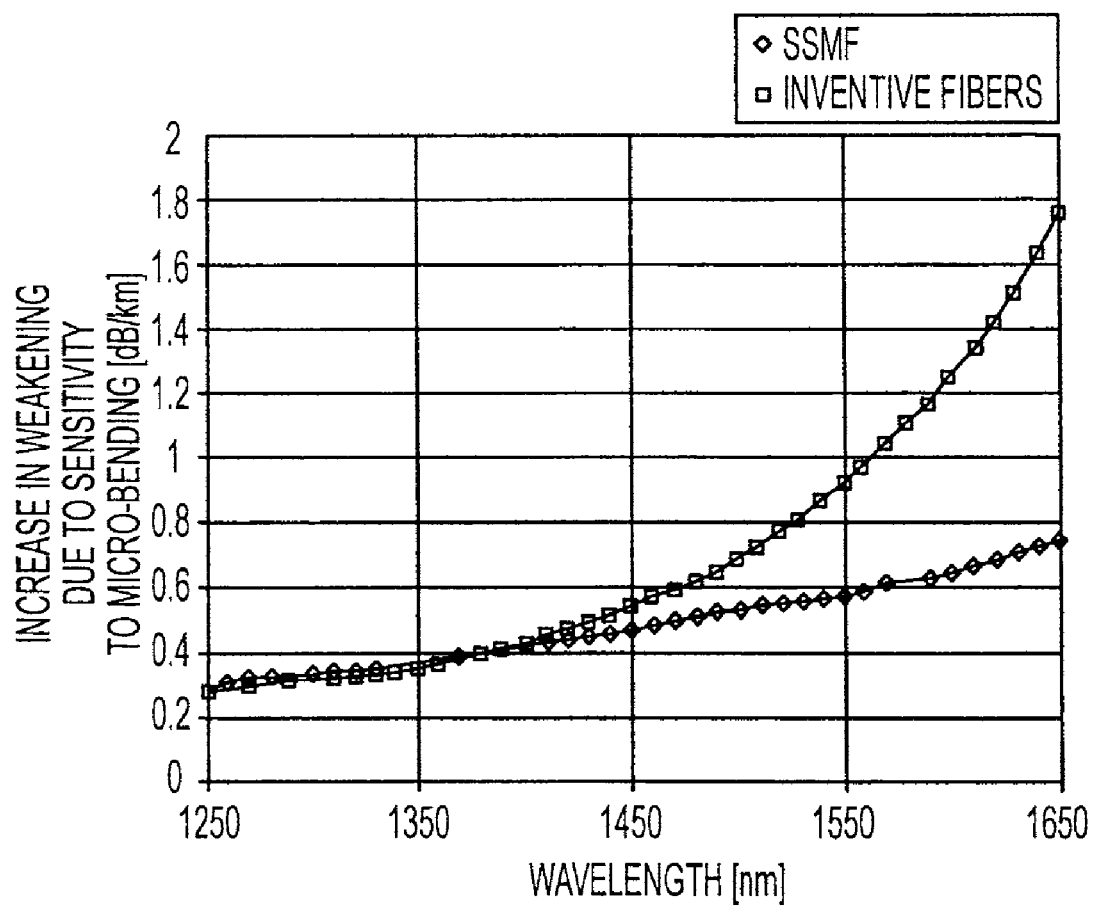
FIG. 4b shows microbending losses using the fixed diameter drum test in relation to the wavelength for a SSMF fiber and for a fiber of the invention having MAC values at a wavelength of 1550 nm of 8.11 and 8.31, respectively.

Also, the graphs in FIGS. 4a and 4b clearly show that the sensitivity of the present fiber to microbending is markedly reduced with respect to that of a SSMF fiber. It can be seen in FIG. 4a that the microbending losses (pin-array test) measured for a fiber of the invention, having a MAC value of 8.44 at a wavelength of 1550 nm, amounts 0.025 dB whereas they are ten times higher for a SSMF fiber having the same MAC value. It can also be seen in FIG. 4b that microbending losses (fixed drum method) for a fiber of the invention increase much more slowly with the wavelength than for a SSMF fiber which has a greater MAC value however at the 1550 nm wavelength. In this graph it can be seen that the present fiber guarantees a sensitivity to microbending up to long wavelengths, greater than 1650 nm, which is equivalent to the sensitivity which can be guaranteed for a SSMF fiber up to a wavelength of 1550 nm.

The present transmission fiber may be manufactured by drawing a preform having one of the above-described index profiles. Said preform profiles may be made for example from a sleeve of silica in which layers of doped silica are deposited. Deposition may be made by a Plasma Chemical Vapor Deposition (PCVD) type deposition method mentioned previously. This chemical of deposition in the vapour form activated by plasma (PCVD) is particularly suitable for obtaining a buried inner cladding layer for the present fiber; this buried cladding layer comprising Germanium in a weight concentration of between 0.5% to 7%. The weight concentration of Germanium is preferably between 0.5% and 1.5% since this allows an optimum balance between lower costs and more ease of manufacturing on the one hand and good fiber characteristics on the other hand.

A pure silica tube is provided and mounted on a lathe. The tube is then caused to rotate and a gaseous mixture of silica and dopants is injected into the tube. The tube passes through a microwave cavity in which the gaseous mixture is locally heated. Microwave heating generates a plasma by ionization of the gases injected into the tube and the ionized dopants react strongly with the silica particles to cause the depositing of layers of doped silica on the inside of the tube.

The strong reactivity of the dopants generated by microwave heating, makes it possible to incorporate a high concentration of dopants in the silica layers. For Fluorine in particular, which is difficult to incorporate into silica with local burner heating, the PCVD technique allows doping of a silica layer with a high concentration of Fluorine to form deeply buried layers.

Within the scope of the invention, the creation of the second buried cladding is obtained by depositing a layer of silica doped with Fluorine and Germanium; a gaseous mixture containing oxygen $O_2$, silica $SiCl_4$, Fluorine $C_2F_6$ and Germanium $GeO_2$ is injected into the tube. This gaseous mixture is ionized in the microwave cavity of a PCVD installation, the Fluorine and Germanium ions are incorporated in the silica particles.

The proportions of injected gases are monitored so as to obtain a layer of doped silica containing Germanium in a weight concentration of 0.5% to 7%. and Fluorine in a concentration that is required to obtain the targeted refractive index.

The strong concentration Fluorine ensures the required reduction in index for the buried cladding, and the low concentration of Germanium brings the changes in viscosity and elastic-optical coefficient that are required to reduce bending losses and microbending losses in the fiber obtained.

The transmission fiber according to the invention may be used in a transmitting or receiving module in an FTTH or FTTC system or in a high rate and long distance optical transmission cable, with reduced optical losses. The fiber of the invention is compatible with the marketed systems as it meets the G.652 standard. In particular, overlengths of the fiber according to the invention may be wound in storage boxes associated with optical modules of FTTH or FTTC systems, the fiber according to the invention may be wound with a bending radius less than 15 mm, or even less than 5 mm without inducing strong optical losses. The fiber according to the invention is also very suitable for supporting accidental bendings related to its installation at an individual's home, with bending radii ranging down to 5 mm.

Evidently, the present invention is not limited to the embodiments described by way of example. In particular, a manufacturing method other than PCVD may be considered provided the method allows the incorporation of Germanium in an buried layer in accordance with the claimed proportions and index differences. In addition, the fiber according to the invention may also be used in applications other than FTTH or FTTC.

The invention claimed is:

1. An optical transmission fiber, comprising:
   a central core and an outer optical cladding, the central core having a step refractive-index profile and a first refractive index difference ($\Delta n_1$) with the outer cladding; and
   a first inner cladding surrounding the central core, the first inner cladding having a second refractive index difference ($\Delta n_2$) with the outer cladding;
   wherein the optical transmission fiber has a cabled cut-off wavelength of 1260 nanometers or less;
   wherein the optical transmission fiber has a dispersion cancellation wavelength ($\lambda_0$) between 1300 nanometers and 1324 nanometers;
   wherein, at a wavelength of 1310 nanometers, the optical transmission fiber has a chromatic dispersion slope of 0.093 ps/(nm$^2$·km) or less; and
   wherein, at a wavelength of 1625 nanometers, the optical transmission fiber has bending losses of 2 dB or less for a winding of one turn around a bending radius of 5 millimeters.

2. The optical transmission fiber according to claim 1, wherein, at a wavelength of 1625 nanometers, the optical transmission fiber has bending losses of less than about 1 dB for a winding of one turn around a bending radius of 5 millimeters.

3. The optical transmission fiber according to claim 1, wherein, in accordance with the ITU-T G.652 standard, at a wavelength of 1310 nanometers, the optical transmission fiber has a mode field diameter (MFD) of between 8.6 microns and 9.5 microns, with a tolerance of +/−0.6 micron.

4. The optical transmission fiber according to claim 1, wherein the central core has a maximum first refractive index difference ($\Delta n_1$) with the outer cladding that is between $4.2 \times 10^{-3}$ and $6.2 \times 10^{-3}$.

5. The optical transmission fiber according to claim 1, wherein:
   the first inner cladding immediately surrounds the central core; and
   the first inner cladding has a second refractive index difference ($\Delta n_2$) with the outer cladding that is between $-1.2 \times 10^{-3}$ and $1.2 \times 10^{-3}$.

6. The optical transmission fiber according to claim 1, wherein the refractive index difference between the central core and the first inner cladding ($\Delta n_1 - \Delta n_2$) is between about $3.9 \times 10^{-3}$ and $5.9 \times 10^{-3}$.

7. The optical transmission fiber according to claim 1, comprising a second inner cladding disposed between the first inner cladding and the outer cladding, the second inner cladding having a third refractive index difference ($\Delta n_3$) with the outer cladding that is less than $-3 \times 10^{-3}$.

8. The optical transmission fiber according to claim 7, wherein the second inner cladding is doped with at least about 0.5 weight percent Germanium.

9. The optical transmission fiber according to claim 1, wherein the optical transmission fiber satisfies the criteria of the ITU-T G.652 recommendations.

10. A cable containing one or more optical transmission fibers according to claim 1.

11. An optical module or a storage box receiving at least a portion of the optical transmission fiber according to claim 1.

12. A Fiber-To-The-Home (FTTH) or a Fiber-To-The-Curb (FTTC) system comprising at least a portion of the optical transmission fiber according to claim 1.

13. An optical transmission fiber, comprising:
a central core and an outer optical cladding, the central core having a step refractive-index profile and a first refractive index difference ($\Delta n_1$) with the outer cladding; and
a first inner cladding surrounding the central core, the first inner cladding having a second refractive index difference ($\Delta n_2$) with the outer cladding;
wherein the optical transmission fiber has a cabled cut-off wavelength of 1260 nanometers or less;
wherein the optical transmission fiber has a dispersion cancellation wavelength ($\lambda_0$) between 1300 nanometers and 1324 nanometers;
wherein, at a wavelength of 1310 nanometers, the optical transmission fiber has a chromatic dispersion slope of 0.093 ps/(nm$^2$·km) or less; and
wherein, at a wavelength of 1625 nanometers, the optical transmission fiber has bending losses of 0.5 dB or less for a winding of one turn around a bending radius of 11 millimeters.

14. The optical transmission fiber according to claim 13, wherein, at a wavelength of 1625 nanometers, the optical transmission fiber has bending losses of less than about 0.1 dB for a winding of one turn around a bending radius of 11 millimeters.

15. The optical transmission fiber according to claim 13, wherein, at a wavelength of 1310 nanometers, the optical transmission fiber has a mode field diameter (MFD) of between about 8.6 microns and 9.5 microns.

16. The optical transmission fiber according to claim 13, wherein the central core has a first refractive index difference ($\Delta n_1$) with the outer cladding that is between $4.2 \times 10^{-3}$ and $6.1 \times 10^{-3}$.

17. The optical transmission fiber according to claim 13, wherein:
the first inner cladding immediately surrounds the central core; and
the first inner cladding has a second refractive index difference ($\Delta n_2$) with the outer cladding that is $-1.2 \times 10^{-3}$ or greater.

18. The optical transmission fiber according to claim 13, comprising a second inner cladding disposed between the first inner cladding and the outer cladding, the second inner cladding having a third refractive index difference ($\Delta n_3$) with the outer cladding that is less than $-3 \times 10^{-3}$.

19. The optical transmission fiber according to claim 18, wherein the second inner cladding is doped with Germanium.

20. The optical transmission fiber according to claim 13, wherein the optical transmission fiber satisfies the criteria of the ITU-T G.652 recommendations.

21. A cable containing one or more optical transmission fibers according to claim 13.

22. A Fiber-To-The-Home (FTTH) or a Fiber-To-The-Curb (FTTC) system comprising at least a portion of the optical transmission fiber according to claim 13.

23. An optical transmission fiber, comprising:
a central core and an outer optical cladding, the central core having a step refractive-index profile and a first refractive index difference ($\Delta n_1$) with the outer cladding; and
a first inner cladding surrounding the central core, the first inner cladding having a second refractive index difference ($\Delta n_2$) with the outer cladding;
wherein the optical transmission fiber has a cabled cut-off wavelength of 1260 nanometers or less;
wherein the optical transmission fiber has a dispersion cancellation wavelength ($\lambda_0$) between 1300 nanometers and 1324 nanometers;
wherein, at a wavelength of 1310 nanometers, the optical transmission fiber has a chromatic dispersion slope of 0.093 ps/(nm$^2$·km) or less; and
wherein, at a wavelength of 1625 nanometers, the optical transmission fiber has bending losses of 1 dB or less for a winding of 100 turns around a bending radius of 15 millimeters.

24. The optical transmission fiber according to claim 23, wherein, at a wavelength of 1625 nanometers, the optical transmission fiber has bending losses of less than about 0.4 dB for a winding of 100 turns around a bending radius of 15 millimeters.

25. The optical transmission fiber according to claim 23, wherein, in accordance with the ITU-T G.652 standard, at a wavelength of 1310 nanometers, the optical transmission fiber has a mode field diameter (MFD) of between 8.0 microns and 10.1 microns.

26. The optical transmission fiber according to claim 23, wherein the central core has a maximum first refractive index difference ($\Delta n_1$) with the outer cladding that is between $4.2 \times 10^{-3}$ and $6.2 \times 10^{-3}$.

27. The optical transmission fiber according to claim 23, wherein:
the first inner cladding immediately surrounds the central core; and
the first inner cladding has a second refractive index difference ($\Delta n_2$) with the outer cladding that is $-1.2 \times 10^{-3}$ or greater.

28. The optical transmission fiber according to claim 23, wherein the refractive index difference between the central core and the first inner cladding ($\Delta n_1 - \Delta n_2$) is between about $3.9 \times 10^{-3}$ and $5.9 \times 10^{-3}$.

29. The optical transmission fiber according to claim 23, comprising a second inner cladding disposed between the first inner cladding and the outer cladding, the second inner cladding having a third refractive index difference ($\Delta n_3$) with the outer cladding that is between $-3\times10^{-3}$ and $-15\times10^{-3}$.

30. The optical transmission fiber according to claim 29, wherein the second inner cladding is doped with between about 0.5 and 7 weight percent Germanium.

31. The optical transmission fiber according to claim 23, wherein the optical transmission fiber satisfies the criteria of the ITU-T G.652 recommendations.

32. A cable containing one or more optical transmission fibers according to claim 23.

33. A Fiber-To-The-Home (FTTH) or a Fiber-To-The-Curb (FTTC) system comprising at least a portion of the optical transmission fiber according to claim 23.

* * * * *